United States Patent [19]

Jadamus et al.

[11] Patent Number: 5,510,160
[45] Date of Patent: Apr. 23, 1996

[54] THERMOPLASTIC MULTILAYER COMPOSITES

[75] Inventors: Hans Jadamus; Stefan Röber, both of Marl, Germany

[73] Assignee: Huels Aktiengesellschaft, Marl, Germany

[21] Appl. No.: 187,511

[22] Filed: Jan. 28, 1994

[30] Foreign Application Priority Data

Aug. 4, 1993 [DE] Germany .......................... 43 26 130.2

[51] Int. Cl.$^6$ .............. B32B 1/08; B32B 27/08; B32B 27/30; B32B 27/34
[52] U.S. Cl. .................. 428/36.91; 428/35.2; 428/35.7; 428/36.9; 428/421; 428/422; 428/474.4; 428/475.5; 428/475.8
[58] Field of Search ..................... 428/421, 422, 428/475.5, 475.8, 474.4, 35.2, 35.7, 36.9, 36.91

[56] References Cited

U.S. PATENT DOCUMENTS

| | | | |
|---|---|---|---|
| 4,727,117 | 2/1988 | Hallden-Abberton et al. | 525/343 |
| 4,971,847 | 11/1990 | Freed | 428/36.7 |
| 5,258,213 | 11/1993 | Mügge et al. | 428/36.91 |

FOREIGN PATENT DOCUMENTS

| | | |
|---|---|---|
| 0419218 | 3/1991 | European Pat. Off. . |
| 0523644 | 1/1993 | European Pat. Off. . |
| 0545368 | 6/1993 | European Pat. Off. . |

OTHER PUBLICATIONS

Research Disclosure, No. 321, Jan. 1991, pp. 68A–68B, M. P. Hallden–Abberton, et al., "Control of Functionality in Glutarimide Polymers".

*Primary Examiner*—D. S. Nakarani
*Attorney, Agent, or Firm*—Oblon, Spivak, McClelland, Maier & Neustadt

[57] ABSTRACT

The present invention relates to a thermoplastic multilayer composite of polyamide and polyvinylidene fluoride having adhesive bonding layers and improved resistance to chemical agents such as, for example, methanol-containing fuels. The multilayer composite comprises:

(I): at least one layer comprising a moulding compound of polyamide,
(II): at least one layer adjacent to said layer (I) comprising a moulding compound comprising a mixture of
  (a) polyvinylidene fluoride, and
  (b) polyglutarimide, wherein the layers (I) and (II) are adhesively bonded to one another.

9 Claims, No Drawings

THERMOPLASTIC MULTILAYER COMPOSITES

BACKGROUND OF THE INVENTION

1. Field of the Invention

The invention relates to thermoplastic multilayer composites of polyamide and polyvinylidene fluoride.

2. Discussion of the Background

There is a series of applications for which polyamides and polyvinylidene fluoride are unsuitable. Polyamides are, for example, not resistant to weathering, since they age on exposure to light and also absorb atmospheric moisture. This leads to discoloration, deterioration of the mechanical properties and distortion. Although polyamides have good mechanical properties, in particular good toughness, they have poor barrier action; thus polar materials can easily migrate through polyamides. This is a great disadvantage, for example, in the case of fuel pipes through which alcohol-containing fuel is conveyed.

Polyvinylidene fluoride generally has good weathering resistance and good chemical resistance. Furthermore, polyvinylidene fluoride has an excellent barrier action with respect to both polar and nonpolar media. However, polyvinylidene fluoride is impact sensitive. In particular, the notched impact strength is insufficient for general use.

It is conventionally known that the majority of polymers, including polyamide and polyvinylidene fluoride (PVDF), are incompatible with one another. However, an adhesive thermoplastic multilayer composite is extremely desirable for industrial applications.

Thermoplastic multilayer composites of PVDF and polyamide moulding compounds are known per se in numerous embodiments. However these are all not adequate for use in industrial applications. Moulding compounds and the thermoplastic multilayer composites produced therefrom should meet the following requirements:

1. The moulding compounds of PVDF and polyamide should adhere strongly to one another in the thermoplastic multilayer composite.
2. The thermoplastic multilayer composite of PVDF and the polyamide moulding compounds should be resistant to fuels.
3. The typical properties of the moulding compounds should not be altered by the modifications which are necessary to meet requirements 1 and 2.

French Patent 2,602,515 describes a two-layer pipe having an outer layer of nylon 11 and an inner layer of plasticized polyvinylidene fluoride. However, an adhesive bond between the layers is not present; thus, pipes made from these layers do not meet the first requirement.

SUMMARY OF THE INVENTION

Accordingly, one object of the present invention is to provide thermoplastic multilayer composites of polyvinylidene fluoride and polyamide moulding compounds which do meet the above requirements.

The present inventors have now found that the above-described requirements 1 to 3 can be met by thermoplastic multilayer composites comprising:

(I). at least one layer comprising moulding compound of polyamide, and (II). at least one layer adjacent to layer (I) comprising a moulding compound comprising a mixture of:

(a) polyvinylidene fluoride, and
(b) polyglutarimide, wherein the layers (I) and (II) are directly bonded to one another.

Components (IIa) and (IIb) are used in a weight ratio of 97.5 to 50: 2.5 to 50, preferably 97.5 to 80: 2.5 to 20 and particularly preferably 96 to 90: 4 to 10.

The thermoplastic multilayer composite can additionally contain further layers of polyvinylidene fluoride polymers adjacent layer (II) but not layer (I).

DETAILED DESCRIPTION OF THE PREFERRED EMBODIMENTS

In accordance with the invention, component (I) can be an aliphatic homo- or copolyamide. Suitable polyamides include polyamides (nylon) 4.6, 6.6, 6.12, 8.10, 10.10 or the like. Preferably polyamides 6, 10.12, 11, 12 and 12.12 are used. The designation of the polyamides corresponds to the international standard, the first figure(s) indicating the number of carbon atoms of the starting diamine and the last figure(s) indicating the number of carbon atoms of the dicarboxylic acid. If only one number is given it indicates that an a,ω-amino-carboxylic acid or the lactam derived therefrom was used as starting material (H. Domininghaus, Die Kunststoffe und ihre Eigenschaften [Plastics and their Properties], page 272, VDI-Verlag (1976)).

Suitable copolyamides useful as component (I) include adipic acid, sebacic acid, suberic acid, isophthalic acid, terephthalic acid as co-acid and bis(4-aminocyclohexyl-)methane, trimethylhexamethylenediamine, hexamethylenediamine or the like as co-diamine. These polyamides can be prepared according to conventional methods (see for example, D. B. Jacobs, J. Zimmermann, Polymerization Processes, pp. 424–467; Interscience Publishers, New York (1977); DE-B 21 52 194).

Other suitable polyamides which can be used as component (I) in accordance with the present invention include mixed aliphatic/aromatic polycondensates. These are described, for example, in U.S. Pat. Nos. 2,071,250; 2,071,251; 2,130,523; 2,130,948; 2,241,322; 2,312,966; 2,512,606 and 3,393,210, and in Kirk-Othmer, Encyclopedia of Chemical Technology, 3rd Edition, Vol. 18, pages 328 and 435, Wiley & Sons (1982). Other polycondensates which can suitably be used as component (I) are poly(ether ester amides) and poly(ether amides). These are conventionally known and are described, for example, in DE-A 27 12 987; DE-A 25 23 991 and DE-A 30 06 961.

Both polyamides containing predominantly amino terminal groups and those containing predominantly carboxyl terminal groups can be employed as component (I). Preferably polyamides containing predominantly amino terminal groups are used.

The number average molecular Weight of the polyamides is suitably greater than 4,000 g/mol, preferably greater than 10,000 g/mol. These average weights correspond to a relative viscosity ($\eta_{rel}$) in the range of from 1.65 to 2.4.

The polyamides may contain up to 40% by weight of other thermoplastics, as long as the latter do not affect the properties according to the invention. Suitable thermoplastics include polycarbonate (H. Schnell, Chemistry and Physics of Polycarbonates, Interscience Publishers, New York (1981), acrylonitrile/styrene/butadiene copolymers (Houben-Weyl, Methoden der organischen Chemie [Methods of organic chemistry], Vol. 14/1, Georg Thieme Verlag Stuttgart, pp. 393–406; Ullmanns Encyclopädie der technischen Chemie [Ullmann's encyclopaedia of industrial chemistry], 4th Edition, Vol. 19, Verlag Chemie Weinheim (1981), pp. 279–284), acrylonitrile/styrene/acrylate copolymers (Ullmanns Encyclopädie der technischen Chemie [Ullmann's encyclopaedia of industrial chemistry], 4th Edition, Vol. 19, Verlag Chemie Weinheim (1981), pp 277–295) acrylonitrile/styrene copolymers (Ullmanns Encyclopädie der technischen Chemie [Ullmann's encyclopaedia of industrial chemistry], 4th Edition, Vol. 19, Verlag Chemie Weinheim (1981), p. 273 ff.) or polyphenylene ethers (DE-A 32 24 691 and DE-A 32 24 692, and U.S. Pat. No. 3,306,874; U.S. Pat. No. 3,306,875 and U.S. Pat. No. 4,028,341).

If necessary, the polyamides can be impact-modified. Suitable modifiers include, for example, ethylene/propylene or ethylene/propylene/diene copolymers (EP-A-0 295 076), polypentenylene, polyoctenylene or random or blocked copolymers of alkenyl-aromatic compounds with aliphatic olefins or dienes (EP-A-0 261 748). Other impact-modifying rubbers can also be used. These include core/shell rubbers having a tough, resilient core of (meth)acrylate, butadiene or styrene/butadiene rubber having a glass transition temperature $T_g < -10°$ C. in which the core may be crosslinked. The shell can be built up of styrene and/or methyl methacrylate and/or further unsaturated monomers (DE-A 21 44 528 and DE-A 37 28 685). The proportion of impact-modifying component should be selected so that the desired properties of the multilayered composite are not adversely affected.

Component (IIa) suitably comprises polyvinylidene fluoride, which is preferably used in plasticizer-free form. The preparation and structure of polyvinylidene fluoride is conventionally known. (Hans R. Kricheldorf, Handbook of Polymer Synthesis, Part A, Verlag Marcel Dekker Inc. New York Basle-Hong Kong, p. 191 ff.; Kunststoff Handbuch [Plastics handbook], 1st Edition, Volume XI, Carl Hanser Verlag Munich (1971), p. 403 ff.).

Component (IIa) can alternatively contain a polyvinylidene fluoride-based copolymer which contains up to 40% by weight, based on the total weight of component (IIa), of other monomers. Suitable examples of such additional monomers include trifluoroethylene, ethylene, propene and hexafluoropropene.

The polyvinylidene fluoride used in accordance with the present invention suitably has a melt flow index of <17 g/10 min, preferably of from 2 to 13 g/10 min (DIN 53 735).

Component (IIb) suitably comprises polyglutarimides which contain at least the following basic building blocks:

i) from 14 to 85% by weight, preferably from 30 to 70% by weight, based on the total weight of component (IIb) of

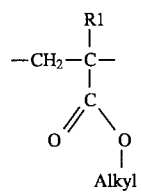

ii) from 10 to 75% by weight, preferably from 20 to 40% by weight, based on the total weight of component (IIb) of

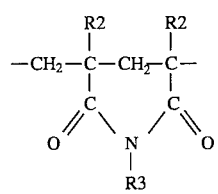

iii) from 0 to 15% by weight, based on the total weight of component (IIb) of

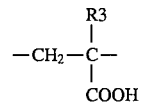

iv) from 7 to 20% by weight, preferably from 8 to 12% by weight, based on the total weight of component (IIb) of

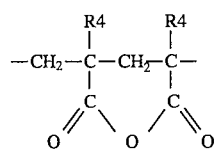

where Alkyl is methyl, ethyl, propyl, butyl, or hexyl; and $R_1$ to $R_4$, identical or different, are hydrogen or $(C_nH_{2n+1})$ where n is an integer of from 1 to 6. Preferably $R_1$ to $R_4$ are methyl. Likewise, Alkyl is preferably methyl.

Polyglutarimides are polyalkylacrylic esters in which two adjacent carboxyl(ate) groups have been reacted to form a cyclic imide. The imide is preferably formed using ammonia or primary amines, such as methylamine. Polyglutarimides can be prepared using conventional methods (Hans R. Kricheldorf, Handbook of Polymer Synthesis, Part A, Verlag Marcel Dekker Inc. New York-Basle-Hong Kong, p. 223 ff.; H. G. Elias, Makromoleküle [Macromolecules], Hüthig und Wepf Verlag Basle -Heidelberg-New York; U.S. Pat. No. 2,146,209 and U.S. Pat. No. 4,246,374).

The polyglutarimides used according to the present invention suitably have a melt flow index of <30 g/10 min, preferably of from 0.2 to 15 g/10 min.

In order to raise the low-temperature impact strength, the polyglutarimides can additionally contain appropriate modifiers. Suitable modifiers include core/shell polymers having a polybutyl acrylate core and a shell of polymethyl methacrylate and/or polyglutarimide. In addition to these other conventional modifiers can be used.

The moulding compounds for the layers (I) and (II) may contain conventional auxiliaries and additives such as, for example, flameproofing agents, stabilizers, plasticizers, processing aids, viscosity improvers, fillers, particularly those for improving the electrical conductivity, pigments or the like. The amount of said agents should be metered in so that the desired properties are not seriously affected.

The moulding compound of the layer according to (II) is prepared by conventional and known processes by mixing melts of components (IIa) and (IIb) in a mixer which provides good kneading, such as a twin-screw extruder, at temperatures which depend on the melting points of components (IIa) and (IIb), generally at temperatures between 200° and 300° C.

The preparation of component (II) from components (IIa) and (IIb) can also be carried out directly in the compounding extruder in which component (II) is compounded for the production of the thermoplastic multilayer composite with layer (I).

Such a morphology comprising an amorphous mixed phase and a crystalline PVDF phase is achieved by the moulding compounds of the invention for components (IIa) and (IIb). Thus, component (II) of the invention shows only one glass transition between −200° C. and the melting point of the PVDF crystals in a torsional oscillation analysis as a function of temperature. The temperature of the transition is determined by the composition of component (II) and by the crystallization conditions of the PVDF. In particular, plotting the storage modulus and the loss modulus as a function of temperature does not show any maximum between −38° C. and −50° C. which would correspond to the glass transition of a pure amorphous PVDF phase.

The above-mentioned requirement No. 3 can be best met when smaller amounts of component (IIb) are used in the moulding compound for layer (II). For example, the barrier action against methanol-containing fuels of mixtures of 95% by weight of polyvinylidene fluoride polymers (component IIa) and 5% by weight of a polyglutarimide moulding compound (component IIb) is only inconsequentially poorer than the barrier action of pure polyvinylidene fluoride.

The production of the multilayer composites according to the present invention can be carried out in one or more stages.

In the single-stage injection-moulding process, the various melts are combined in a mould and the moulded part is allowed to cool (multicomponent injection moulding). In the single-stage extrusion process the various melts are co-extruded in a conventional manner.

In the multistage processes, a moulding is first produced from one of components (I) or (II) and then bonded to the remaining components by pressure, injection moulding or extrusion.

The multilayer composites of the present invention have outstanding resistance to, and barrier action against the diffusion of chemical agents, solvents and fuels. Furthermore, the layers (I) and (II) are adhesively bonded to one another so that delamination of the various layers from one another does not occur, for example, during thermal expansion or flexing of the finished part. In addition, it is also possible to produce parts which have a number of multilayer composites of the invention on top of one another (alternately). The multilayer composites of the invention can be used in structural parts, particularly in the areas of electrical, engineering and automobile industries, where the barrier action of the polyvinylidene fluoride is to be combined with the good mechanical properties of the polyamide, particularly the very good low-temperature impact strength, or where the disadvantageous properties of the polyamide, such as poor UV resistance, insufficient scratch resistance or poor chemical resistance, are to be counteracted by a coating of polyvinylidene fluoride.

Having generally described this invention, a further understanding can be obtained by reference to certain specific examples which are provided herein for purposes of illustration only and are not intended to be limiting unless otherwise specified.

EXAMPLES

The parameters mentioned were determined using the following measurement methods.

The determination of the melt flow index of the polyvinylidene fluorides was carried out at 230° C. and under a load of 5 kg (DIN 53 735).

The determination of the melt flow index of the polyglutarimides was carried out at 230° C. and under a load of 3.8 kg (DIN 53 735).

The testing of the ease of mechanical separation at the interface is carried out using a metal wedge (edge angle: 5°; loading weight: 2.5 kg); this test attempts to separate the material interface layer to be tested. If separation takes place at the interface between the components, the adhesion is poor. If, by contrast, the separation takes place wholly or partly within one of the two components, good adhesion is present.

The determination of the solution viscosity (relative viscosity $\eta_{rel}$) of the polyamides was carried out using a 0.5% strength by weight m-cresol solution at 25° C. in accordance with DIN 53 727/ISO 307.

For the determination of the amino terminal groups, 1 g of the polyamides was dissolved in 50 ml of m-cresol at 25° C. The solution was titrated potentiometrically with perchloric acid.

For the determination of the carboxyl terminal groups in the polyamides, 1 g of polycondensate was dissolved in 50 ml of benzyl alcohol under a blanket of nitrogen at 165° C. The dissolution time was a maximum of 20 minutes. The solution was titrated with a solution of KOH in ethylene glycol (0.05 mol of KOH/l) against phenolphthalein until the color changes.

Examples denoted by letters are not according to the invention.

Component I

PA1: Polyamide 12 ($\eta_{rel}$: 2.1; plasticizer content: 0; 9 mmol/kg of amino terminal groups; 48 mmol/kg of carboxyl terminal groups; VESTAMID® L 2140-HÜLS AG).

PA 2: Polyamide 12 ($\eta_{rel}$: 2.1; plasticizer content per 100 parts by weight of polyamide: 15 parts by weight of N-n-butylbenzenesulphonamide; 9 mmol/kg of amino terminal groups; 48 mmol/kg of carboxyl terminal groups; VESTAMID® L 2124-HÜLS AG).

PA 3: Polyamide 12 ($\eta_{rel}$: 2.1; plasticizer content per 100 parts by weight of polyamide: 15 parts by weight of N-n-butylbenzenesulphonamide; 50 mmol/kg of amino terminal groups; 8 mmol/kg of carboxyl terminal groups).

PA 4: Polyamide 6.12 ($\eta_{rel}$: 1.9; plasticizer content: 0; 93 mmol/kg of amino terminal groups; 29 mmol/kg of carboxyl terminal groups).

PA 5: Polyamide 6 ($\eta_{rel}$: 2.01; plasticizer content: 0; 33 mmol/kg of amino terminal groups; 31 mmol/kg of carboxyl terminal groups).

Component II

PVDF 1: Polyvinylidene fluoride (melt flow index: 13 g/10 min, DYFLOR® LE-HÜLS AG).

PVDF 2: Polyvinylidene fluoride (melt flow index: 8.5 g/10 min, DYFLOR® EE-HÜLS AG).

PVDF 3: Polyvinylidene fluoride comprising
  a) 100 parts by weight of polyvinylidene fluoride (melt flow index: 8.5 g/10 min, DYFLOR® EE-HÜLS AG) and
  b) 6 parts by weight of commercial conductive carbon black (Ketjenblack™ EC 300-AKZO).

The polymers used as component (IIb) were made up of the building blocks designated by i) to iv) as described above where the alkyl and $R_1$ to $R_4$ moieties were each methyl.

|  | P 1 | P 2 | P 3 | P 4 |
|---|---|---|---|---|
| % by weight i) | 100 | 14 | 11 | 57 |
| % by weight ii) | 0 | 86 | 80 | 30 |
| % by weight iii) | 0 | 0 | 6 | 3 |
| % by weight iv) | 0 | 0 | 3 | 10 |

Z1: Mixture comprising
  a) 50% by weight of PVDF 1 and
  b) 50% by weight of P1
Z2: Mixture comprising
  a) 50% by weight of PVDF 1 and
  b) 50% by weight of P2.
Z3: Mixture comprising
  a) 50% by weight of PVDF 1 and
  b) 50% by weight of P3.
Z4: Mixture comprising
  a) 50% by weight of PVDF 1 and
  b) 50% by weight of P4.
Z5: Mixture comprising
  a) 90% by weight of PVDF 1 and
  b) 10% by weight of P4.
Z6: Mixture comprising
  a) 95% by weight of PVDF 2 and
  b) 5% by weight of P4.
Z7: Mixture comprising
  a) 90% by weight of PVDF 3 and
  b) 10% by weight of P4.

Production of the thermoplastic multilayer composites

Both two-layer films and also two- and three-layer pressed sheets were produced, The production of the two-layer films was carried out in a laboratory co-extrusion unit, the two feeder extruders of which have a screw diameter of 25 mm and 30 mm respectively. The barrel temperatures were 230° C. (PA 1, PA 2, PA 3), 250° C. (Z1, Z2, Z3, Z4, Z5, Z6) and 280° C. (PA 4, PA 5). The layer thicknesses were each 0.5 mm.

The production of the pressed composites was carried out in a laboratory press at 270° C. for experiments with PA 4 and PA 5 at 280° C., and using a pressing time of 5 minutes.

The mechanical properties of each of the thermoplastic multilayered composites are summarized in the following tables.

TABLE I

| | Layer | | Mechanically separable at the interface | | | |
|---|---|---|---|---|---|---|
| | | | Two-layer film after storage at 23° C., 20 d | | Pressed sheet after storage at 23° C., 20 d | |
| No. | I | II | in air | in M 15* | in air | in M 15* |
| A | PA 1 | PVDF 1 | yes | yes | yes | yes |
| B | PA 4 | PVDF 3 | yes | yes | yes | yes |
| C | PA 2 | Z1 | yes | yes | yes | yes |
| D | PA 3 | Z2 | yes | yes | yes | yes |
| E | PA 1 | Z3 | partly | yes | partly | yes |
| 1 | PA 1 | Z4 | no | no | no | no |
| 2 | PA 2 | Z4 | no | no | no | no |
| 3 | PA 5 | Z4 | no | no | no | no |
| 4 | PA 4 | Z4 | no | no | no | no |

TABLE I-continued

| | Layer | | Mechanically separable at the interface | | | |
|---|---|---|---|---|---|---|
| | | | Two-layer film after storage at 23° C., 20 d | | Pressed sheet after storage at 23° C., 20 d | |
| No. | I | II | in air | in M 15* | in air | in M 15* |
| 5 | PA 3 | Z6 | no | no | no | no |
| 6 | PA 3 | Z7 | no | no | no | no |
| 7 | PA 2 | Z5 | no | no | no | no |

TABLE II

| | Pressed sheet of 3 layers: | | | | |
|---|---|---|---|---|---|
| | Layer (layers next to one another are adjacent) | | | Mechanically separable at the interface after storage in M 15* | |
| | | | | Layers | Layers |
| No. | I | II | III | I and II | II and III |
| 8 | PA 3 | Z5 | PVDF 3 | no | no |

*Storage at 23° C. for 20 days in standard fuel M 15 (42.5% by volume of isooctane, 42.5% by volume of toluene and 15% by volume of methanol)

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A thermoplastic multilayer composite comprising:

(I) at least one layer comprising a molding compound of a polyamide, and (II) at least one layer adjacent to said layer (I) comprising a molding compound comprising a mixture of:
  (a) from 97.5 to 50% by wt. of polyvinylidene fluoride or vinylidene fluoride copolymer, and
  (b) from 2.5 to 50% by wt. of polyglutarimide comprised of the monomer units:
    (i) from 14 to 85% by weight of

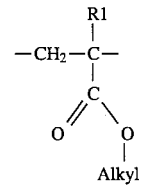

(ii) from 10 to 75% by weight of

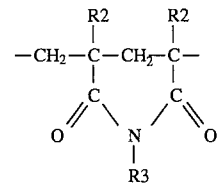

(iii) from 0 to 15% by weight of

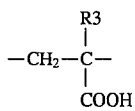

(iv) from 7 to 20% by weight of

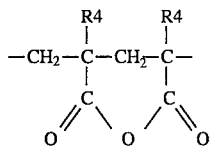

wherein the sum of (i), (ii), (iii) and (iv) of component IIb is 100%, and wherein alkyl is methyl, ethyl, propyl, butyl, or hexyl; and $R_1$ to $R_4$, identical or different, are hydrogen or $(C_nH_{2n+1})$ wherein n is an integer of from 1 to 6, and wherein said layers (I) and (II) are directly bonded to one another.

2. The thermoplastic multilayer composite according to claim 1, wherein said layer (II) comprises a moulding compound comprising a mixture of:
(a) from 97.5 to 80% by weight of polyvinylidene fluoride, and
(b) from 2.5 to 20% by weight of polyglutarimide.

3. The thermoplastic multilayer composite according to claim 1, wherein said layer (II) comprises a moulding compound comprising a mixture of:
(a) from 96 to 90% by weight of polyvinylidene fluoride, and
(b) from 4 to 10% by weight of polyglutarimide.

4. The thermoplastic multilayer composite according to claim 1, wherein said polyglutarimide comprises:
(i) from 30 to 70% by weight of

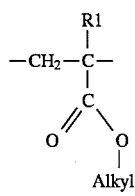

(ii) from 20 to 40% by weight of

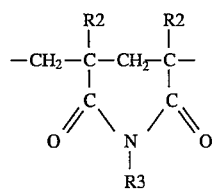

(iii) from 0 to 15% by weight of

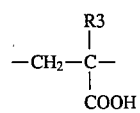

(iv) from 8 to 12% by weight of

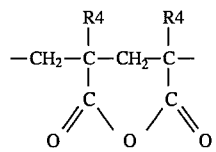

wherein Alkyl is methyl, ethyl, propyl, butyl or hexyl; and $R_1$ to $R_4$, identical or different, are hydrogen or $(C_nH_{2n+1})$ wherein n is an integer of from 1 to 6.

5. The thermoplastic multilayer composite according to claim 1, wherein said layer (I) is a moulding compound comprising polyamide 12.

6. The thermoplastic multilayer composite according to claim 1, wheren said alkyl and $R_1$ to $R_4$ are each methyl.

7. The thermoplastic multilayer composite according to claim 1, wherein said polyvinylidene fluoride is electrically conductive and has a surface resistance of less than $10^9$ ohm.

8. A molding comprising a thermoplastic multilayer composite comprising:
(I) at least one layer comprising a molding compound of a polyamide, and
(II) at least one layer adjacent to said layer (I) comprising a molding compound comprising a mixture of:
(a) from 97.5 to 50% by wt. of polyvinylidene fluoride, and
(b) from 2.5 to 50% by wt. of polyglutarimide comprised of the monomer units:
(i) from 14 to 85% by weight of

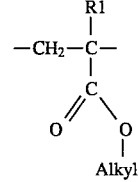

(ii) from 10 to 75% by weight of

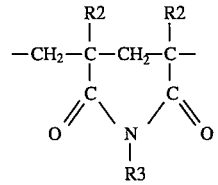

(iii) from 0 to 15% by weight of

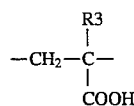

(iv) from 7 to 20% by weight of

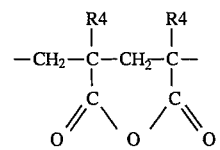

wherein the sum of (i), (ii), (iii) and (iv) is 100% of component IIb, and wherein alkyl is methyl, ethyl, propyl, butyl, or hexyl; and $R_1$ to $R_4$, identical or different, are hydrogen or $(C_nH_{2n+1})$ wherein n is an integer of from 1 to 6, and wherein said layers (I) and (II) are directly bonded to one another.

9. A hollow profile comprising a thermoplastic multilayer composite comprising:

(I) at least one layer comprising a molding compound of a polyamide, and (II) at least one layer adjacent to said layer (I) comprising a molding compound comprising a mixture of (a) from 97.5 to 50% by wt. of polyvinylidene fluoride, and (b) from 2.5 to 50% by wt. of polyglutarimide comprised of the monomer units:

(i) from 14 to 85% by weight of

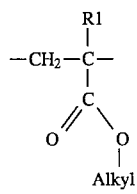

(ii) from 10 to 75% by weight

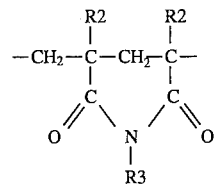

(iii) from 0 to 15% by weight of

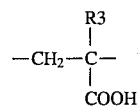

(iv) from 7 to 20% by weight of

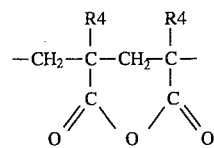

wherein the sum of (i), (ii), (iii) and (iv) is 100% of component IIb, and wherein alkyl is methyl, ethyl, propyl, butyl, or hexyl; and $R_1$ to $R_4$, identical or different, are hydrogen or $(C_nH_{2n+1})$ wherein n is an integer of from 1 to 6, and wherein said layers (I) and (II) are directly bonded to one another.

* * * * *